United States Patent [19]

Weil et al.

[11] Patent Number: 4,786,000
[45] Date of Patent: Nov. 22, 1988

[54] BOTTLE BREAKING APPARATUS

[75] Inventors: Eric P. Weil, Greenfield; Matthew T. Boswell, Pewaukee, both of Wis.

[73] Assignee: Galland Henning Nopak, Inc., Milwaukee, Wis.

[21] Appl. No.: 8,649

[22] Filed: Jan. 29, 1987

[51] Int. Cl.⁴ .............................................. B02C 19/14
[52] U.S. Cl. ...................................... 241/36; 241/99; 241/100
[58] Field of Search .................... 100/902; 241/36, 99, 241/100

[56] References Cited

U.S. PATENT DOCUMENTS

| 2,048,478 | 7/1936 | Young . | |
| 2,176,552 | 10/1939 | Vocaturo . | |
| 2,190,971 | 2/1940 | Boedeker . | |
| 2,230,019 | 1/1941 | Tucke . | |
| 2,317,942 | 4/1943 | Sabini . | |
| 2,558,255 | 6/1951 | Johnson et al. | 241/100 X |
| 2,645,428 | 7/1953 | Kandle | 241/99 |
| 2,756,937 | 7/1956 | Smith | 241/99 |
| 2,813,569 | 11/1957 | Nelson . | |
| 3,411,722 | 11/1968 | Webber | 241/99 |
| 3,517,607 | 6/1970 | Keagle . | |
| 3,709,440 | 1/1973 | Kowtz | 241/99 X |
| 3,750,965 | 8/1973 | Madden et al. | 241/36 |
| 3,976,002 | 8/1976 | Gerlach . | |
| 4,088,274 | 5/1978 | Smith | 241/99 |
| 4,248,334 | 2/1981 | Hanley et al. . | |
| 4,285,426 | 8/1981 | Cahill . | |
| 4,345,518 | 8/1982 | Cash et al. . | |
| 4,489,649 | 12/1984 | Daugherty . | |

FOREIGN PATENT DOCUMENTS 1592547  7/1981  United Kingdom ................. 241/99

Primary Examiner—Mark Rosenbaum
Attorney, Agent, or Firm—Michael, Best & Friedrich

[57] ABSTRACT

A bottle breaking apparatus comprising a bottle breaking member including a plate, and a punch extending outwardly from the plate, a V-shaped wall for supporting a bottle opposite the punch, and a pneumatic assembly for moving the plate toward the bottle so that the punch shatters the bottle and the plate further breaks the bottle.

11 Claims, 3 Drawing Sheets

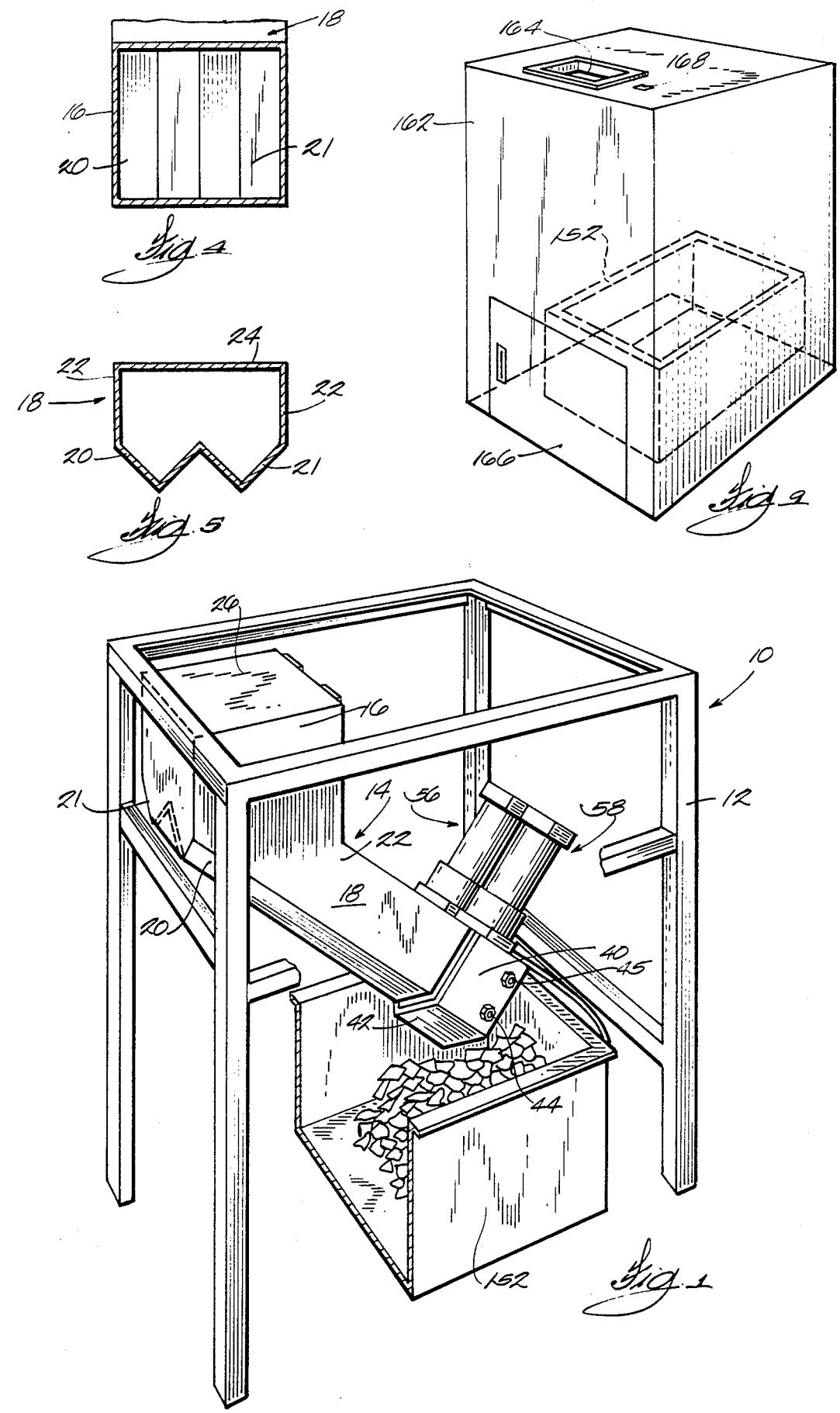

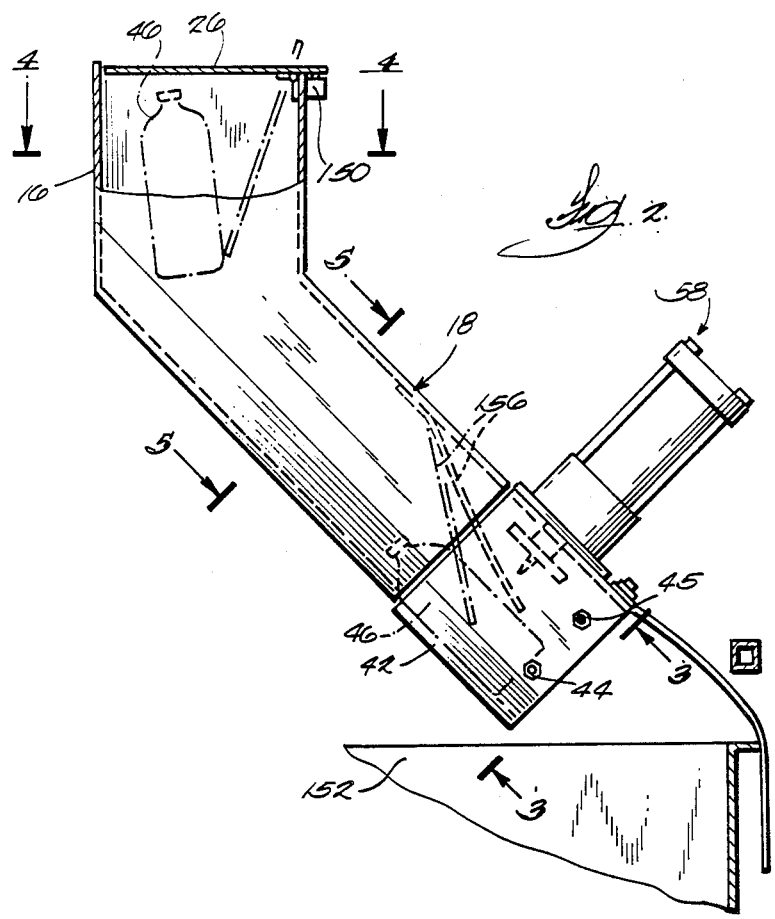
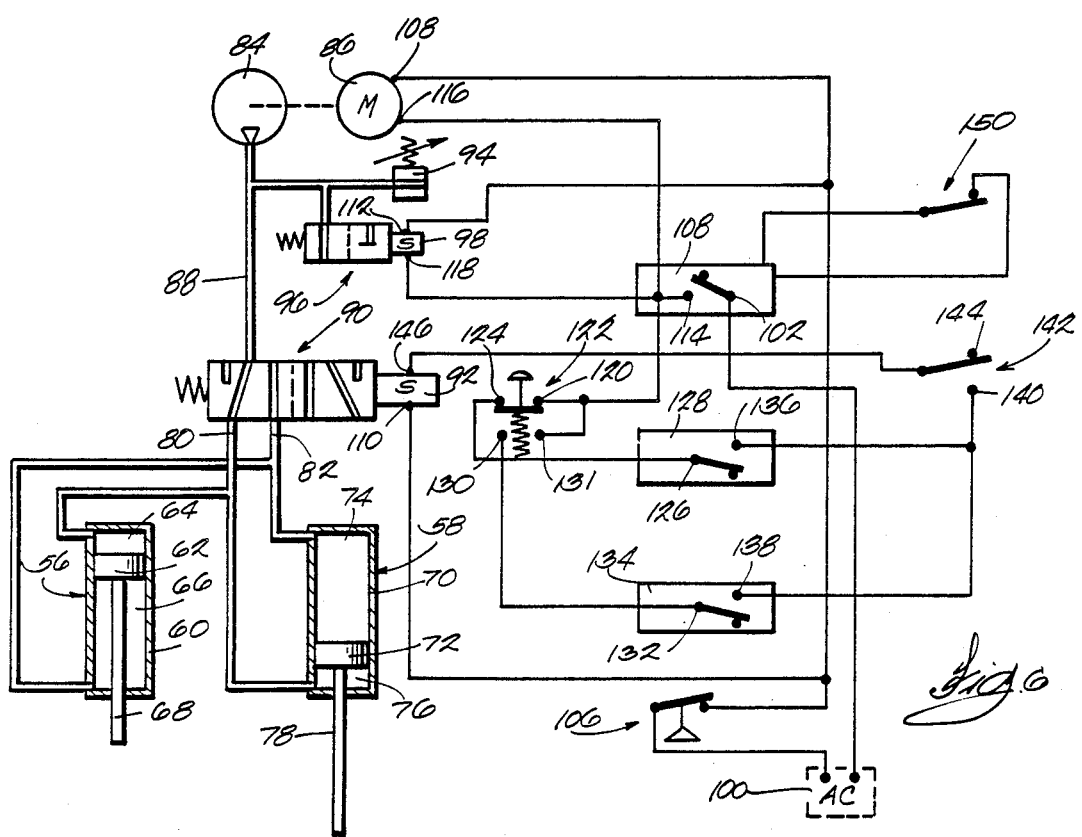

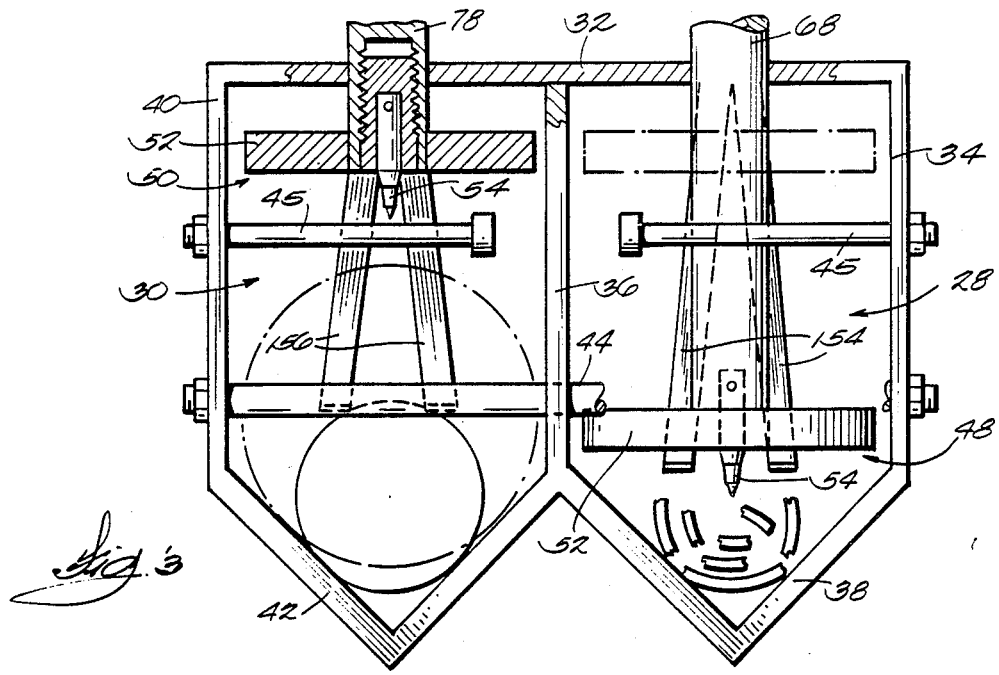
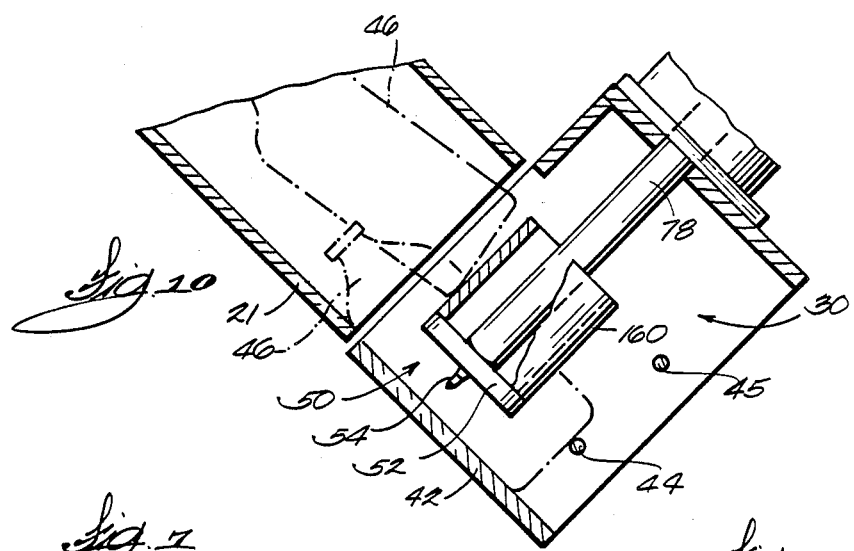
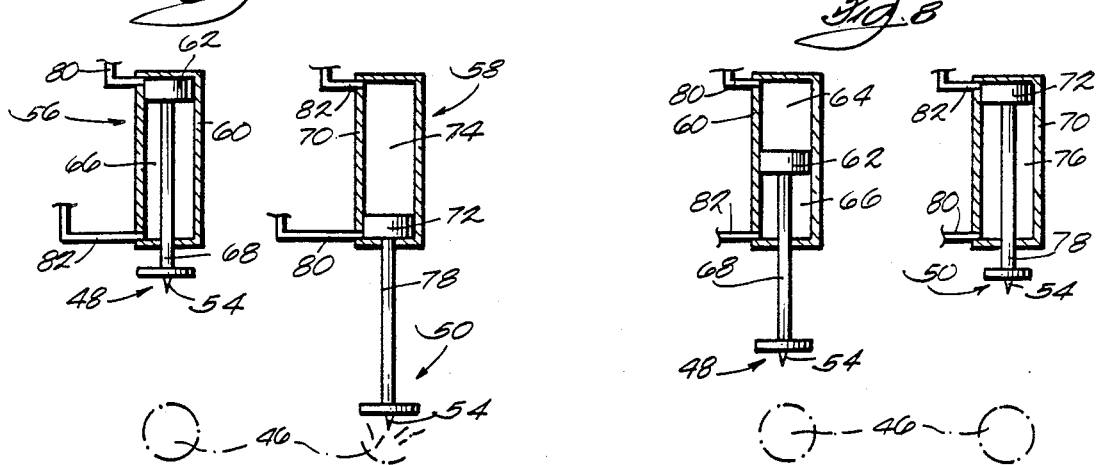

BOTTLE BREAKING APPARATUS

BACKGROUND OF THE INVENTION

The invention relates to glass bottle recycling apparatus, and more particularly to bottle breaking or crushing apparatus.

U.S. Pat. No. 4,088,274 Smith discloses a bottle crusher in which a glass bottle is crushed between a pair of jaws having pointed teeth. One of the jaws is stationary and the teeth thereon are arranged to form a craddle for supporting the bottle. The other jaw is movable toward the stationary jaw for crushing the bottle between the teeth of the two jaws.

U.S. Pat. No. 3,976,002 Gerlach discloses a can and bottle crusher including a hydraulically powered piston movable into a crushing chamber for crushing cans and bottles against a fixed end wall of the chamber.

A disadvantage of prior art bottle crushing apparatus is that these apparatus tend to pulverize bottles or break the bottles into fragments which are smaller than are desirable for conventional recycling processes.

Attention is directed to the following U.S. patents:
Vocaturo—U.S. Pat. No. 2,176,552—Oct. 17, 1939
Boedeker—U.S. Pat. No. 2,190,971—Feb. 20, 1940
Smith—U.S. Pat. No. 2,756,937—July 31, 1956
Hanley—U.S. Pat. No. 4,248,334—Feb. 3, 1981
Cahill—U.S. Pat. No. 4,285,426—Aug. 25, 1981

SUMMARY OF THE INVENTION

The invention provides a bottle breaking apparatus which breaks bottles into relatively large pieces that are suitable for use in conventional recycling processes. Compared to the small fragments or "powder" produced by prior art bottle crushing apparatus, these relatively large pieces are also cleaner and safer to handle.

The preferred embodiment of the invention is a bottle breaking apparatus suitable for use, for example, at a grocery store where non-refillable glass bottles are broken for purposes of recyclying and/or to conserve storage space. The apparatus comprises a chute assembly including an upwardly opening inlet and a pair of integrally connected, side-by-side troughs slanting downwardly from the inlet. The apparatus also comprises a door pivotally mounted on the upper end of the inlet, and a pair of bottle breaking chambers located at the lower ends of the troughs.

The apparatus also comprises a pair of bottle breaking members respectively located in the chambers. Each of the bottle breaking members includes a plate and a punch extending outwardly from the plate, and each is powered by a pneumatic cylinder and piston assembly. Each of the chambers includes a V-shaped wall which supports and centers a bottle opposite the punch. Because the wall is V-shaped, the bottle is not directly supported by the wall opposite the punch. More particularly, the rear of the bottle relative to the punch is not supported by the wall. Instead, the wall supports the opposite sides of the bottle. Furthermore, because it is V-shaped, the wall can support bottles of various diameters.

The pneumatic assemblies are powered by an air compressor. In the preferred embodiment, the air compressor is connected to the pneumatic assemblies by a pneumatic circuit which provides alternating movement of the bottle breaking members. In other words, when one bottle breaking member begins moving toward a bottle, or begins moving through its breaking stroke, the other bottle breaking member begins moving in the opposite direction, or begins moving through its return stroke. Furthermore, in the preferred embodiment, each bottle breaking member moves through its return stroke faster than the other bottle breaking member moves through its breaking stroke. As a result, by the time one bottle breaking member engages a bottle, the other bottle breaking member has completed its return stroke. Therefore, the full power of the air compressor is available for causing the one bottle breaking member to complete its breaking stroke.

It is possible that the apparatus may become jammed, either because the punches are dull or because large bottles are being broken. For this reason, the apparatus also comprises a clear button which permits the operator to decrease the frequency of alternation of the bottle breaking members. This allows more time for pressure to build up in the pneumatic assemblies and thereby increases the forces moving the bottle breaking members through their breaking strokes.

The apparatus also comprises a trigger switch which is connected to the door and which activates the apparatus when a bottle is inserted through the door. In the preferred embodiment, the apparatus operates for 25 seconds after the door is opened, and this period is reset every time the door is opened. The apparatus also comprises an interlock switch which is connected to the door and which temporarily deactivates the pneumatic assemblies whenever the door is open. The apparatus further comprises a bin for containing broken glass, and a shut-off switch for deactivating the apparatus when the bin is full.

The apparatus is initially activated by the trigger switch when the door is opened by the insertion of a bottle or bottles into the inlet. From the inlet, the bottles slide down the troughs and into the chambers. In the chambers, the bottles are broken by the bottle breaking members. More particularly, a bottle is first shattered by a punch and is then further broken by a plate. Because the plate does not extend all the way to the wall, the bottle is not pulverized.

The operator can continue to insert bottles while the apparatus is operating. Every time the door is opened, the interlock switch deactivates the pneumatic assemblies until the door is closed. As long as the door is closed, the bottle breaking members will reciprocate at a relatively high frequency. If the apparatus becomes jammed, the operator pushes the clear button. This causes the bottle breaking members to reciprocate at a relatively low frequency. As explained above, the lower frequency increases the forces breaking the bottles.

If the bin becomes full while the apparatus is operating, the shut-off switch deactivates the apparatus.

Other features and advantages of the invention will become apparent to those skilled in the art upon review of the following detailed description, claims, and drawings.

DESCRIPTION OF THE DRAWINGS

FIG. 1 is a perspective view of a bottle breaking apparatus embodying the invention.

FIG. 2 is a partial side view, partially in cross section, of the apparatus.

FIG. 3 is a view taken along line 3—3 in FIG. 2.

FIG. 4 is a view taken along line 4—4 in FIG. 2.

FIG. 5 is a view taken along line 5—5 in FIG. 2.

FIG. 6 is a schematic view of the pneumatic and electrical circuits of the apparatus.

FIG. 7 is a schematic view of the pneumatic cylinder and piston assemblies of the apparatus.

FIG. 8 is a schematic view of the pneumatic cylinder and piston assemblies of the apparatus.

FIG. 9 is a perspective view of a cabinet which is adapted to contain the apparatus.

FIG. 10 is a partial, vertical cross sectional view of an alternative embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A bottle breaking apparatus 10 embodying the invention is illustrated in the drawings. As shown in FIG. 1, the apparatus 10 comprises a frame 12, and a chute assembly 14 mounted on the frame 12. The chute assembly 14 includes an upwardly opening mouth or inlet 16, and a trough section 18 including a pair of integrally connected, side-by-side troughs 20 and 21 slanting downwardly from the inlet 16. The inlet 16 is generally rectangular in cross section, as shown in FIG. 4, and the troughs 20 and 21 are V-shaped, as shown in FIG. 5. The troughs 20 and 21 are enclosed by a pair of side walls 22 and a top wall 24 which extend integrally from the inlet 16.

The apparatus 10 also comprises a cover or door 26 pivotally mounted on the upper end of the inlet 16. As shown in FIG. 2, the door 26 is movable from a closed position (shown in solid lines) to an open position (shown in dotted lines) for affording access to the inlet 16. The apparatus 10 also comprises a pair of bottle breaking chambers 28 and 30 integrally connected to the trough section 18 and located at the lower ends of the troughs 20 and 21, respectively. As shown in FIG. 3, the combined chambers 28 and 30 have a shape substantially identical to the shape of the trough section 18. The chamber 28 is defined by a top wall 32, an outer wall 34, an inner wall 36, and a V-shaped bottom wall 38, and the chamber 30 is defined by the top wall 32, an outer wall 40, the inner wall 36, and a V-shaped bottom wall 42. Extending across the lower ends of the chambers 28 and 30 are a supporting bar 44, and supporting bars 45 which are generally parallel to the bar 44.

As shown in FIG. 2, a bottle 46 inserted into the inlet 16 will fall into one of the troughs 20 and 21 and will then slide into the associated chamber 28 or 30, where the bottle 46 will be supported by one or both of the supporting rods 44 and the associated bottom wall 38 or 42.

The apparatus 10 also comprises a pair of bottle breaking means or members 48 and 50 located in the chambers 28 and 30, respectively. Each bottle breaking member includes a plate 52 which faces the associated chamber bottom wall 38 or 42, and a punch 54 extending outwardly from the plate 52 and toward the associated bottom wall 38 or 42.

Since the punch 54 extends toward the associated bottom wall, the bottom wall constitutes means for supporting a bottle 46 opposite the punch 54. Furthermore, the bottom wall centers the bottle opposite the punch 54. It should be noted that, because the wall is V-shaped, the bottle 46 is not directly supported by the wall opposite the punch 54. It has been found that this arrangement increases the effectiveness of the punch 54 for shattering the bottle 46.

In alternative embodiments, the bottom walls 38 and 42 of the chambers 28 and 30 need not be V-shaped. Preferably, the walls 38 and 42 include opposed, converging wall segments so that the walls 38 and 42 can support bottles of various diameters and center the bottles opposite the punches 54.

The apparatus 10 also comprises means for moving each of the bottle breaking members 48 and 50 in a direction generally perpendicular to the plate 52 and toward the associated bottom wall 38 or 42 so that the punch 54 shatters a bottle 46 supported by the bottom wall and the plate 52 further breaks the bottle 46. While various suitable moving means can be employed, in the preferred embodiment, the moving means includes means for applying to each of the bottle breaking members 48 and 50 alternative first and second forces for respectively moving the members 48 and 50 toward and away from the respective bottom walls 38 and 42. While various suitable force applying means can be used, in the illustrated construction, this means includes pneumatic assemblies 56 and 58 respectively mounted on the chambers 28 and 30 and respectively connected to the bottle breaking members 48 and 50. The assembly 56 includes a cylinder 60, a piston 62 slideably received in the cylinder 60 and dividing the cylinder 60 into chambers 64 and 66, and a piston rod 68 extending through the chamber 66 and connecting the piston 62 to the bottle breaking member 48. The assembly 58 includes a cylinder 70, a piston 72 slideably received in the cylinder 70 and dividing the cylinder 70 into chambers 74 and 76, and a piston rod 78 extending through the chamber 76 and connecting the piston 72 to the bottle breaking member 50. It should be understood that, in alternative embodiments, hydraulic assemblies can be used in place of pneumatic assemblies.

The apparatus 10 further comprises (see FIG. 6) a pneumatic circuit including first conduit means 80 communicating with the chamber 64 of the cylinder 60 and with the chamber 76 of the cylinder 70, second conduit means 82 communicating with the chamber 66 of the cylinder 60 and with the chamber 74 of the cylinder 70, and means for alternatingly supplying fluid (in the preferred embodiment, air) to the first and second conduit means 80 and 82. Thus, the pneumatic circuit causes alternating movement of the piston rods 68 and 78, i.e., the rod 68 extends while the rod 78 retracts, and the rod 78 extends while the rod 68 retracts. However, as explained below, each of the piston rods 68 and 78 retracts faster than the other extends.

While various suitable fluid supplying means can be used, in the preferred embodiment, this means includes an air compressor 84 powered by an electric motor 86, an outlet conduit 88 communicating with the air compressor 84, and valve means for alternatingly connecting the outlet conduit 88 to the first and second conduit means 80 and 82. In the illustrated construction, the valve means includes a conventional valve 90 which is actuated by a solenoid 92 and which is movable between a first position (shown in FIG. 6) in which the outlet conduit 88 communicates with the first conduit means 80 and the second conduit means 82 is vented to the atmosphere, and a second position (not shown) in which the outlet conduit 88 communicates with the second conduit means 82 and the first conduit means 80 is vented to the atmosphere. The valve 90 is in the first position when the solenoid 92 is not energized and is in the second position when the solenoid 92 is energized.

Due to the volumes of the piston rods 68 and 78 in the chambers 66 and 76, respectively, each of the piston rods 68 and 78 retracts faster than the other of the piston rods 68 and 78 extends. This is illustrated in FIGS. 7 and 8. In FIG. 7, the pneumatic assemblies 56 and 58 are shown with the piston rod 78 fully extended and with the piston rod 68 fully retracted. This condition is caused by supplying fluid to the second conduit means 82 and thus to the cylinder chambers 66 and 74. When fluid is thereafter supplied to the first conduit means 80 and thus to the cylinder chambers 64 and 76, the cylinder chamber 76 will fill faster than the chamber 64 because of the volume of the piston rod 78 in the chamber 76. In the preferred embodiment, the chamber 76 will fill approximately twice as fast as the chamber 64. Accordingly, the pneumatic assemblies 56 and 58 will momentarily be as shown in FIG. 8, with the piston rod 78 fully retracted and with the piston rod 68 only half extended. The advantage of this arrangement is that once the piston rod 78 is fully retracted, the entire power of the air compressor 84 is available for extending the piston rod 68 and breaking a bottle. In other words, the power of the air compressor 84 is not used for retracting a piston rod when it is needed for breaking a bottle. After the piston rod 68 is fully extended and the fluid supply is alternated to the second conduit means 82, the reverse situation occurs, i.e., the piston rod 68 fully retracts before the piston rod 78 fully extends.

The pneumatic circuit also includes a pressure relief valve 94 communicating with the outlet conduit 88, and means for selectively venting the outlet conduit 88 to the atmosphere. While various suitable venting means can be employed, in the preferred embodiment, the venting means includes a conventional valve 96 which is actuated by a solenoid 98 and which is movable between a first position (shown in FIG. 6) in which the outlet conduit 88 is vented to the atmosphere, thereby preventing the application of pressure to either of the first and second conduit means 80 and 82, and a second position (not shown) in which the outlet conduit 88 is not vented to the atmosphere, so that pressure may be applied to the first and second conduit means 80 and 82. The valve 96 is opened whenever the apparatus 10 is not operating so that the compressor 84 does not start under load and so that all pressure in the circuit is relieved when the apparatus 10 stops operating.

The apparatus 10 also comprises manually operable means for selectively increasing the forces moving the bottle breaking members 48 and 50 toward the bottom walls of the chambers 28 and 30. While various suitable means can be employed, in the preferred embodiment, this means includes means for decreasing the frequency with which fluid is alternatingly supplied to the first and second conduit means 80 and 82. Decreasing the frequency allows more time for pressure to build up and thereby increases the forces extending the piston rods 68 and 78. While various suitable means can be employed for decreasing this frequency, in the preferred embodiment, such means includes a clear button 168.

The manner in which the clear button 168 decreases the frequency is described below.

The apparatus 10 further comprises means for temporarily deactivating the pneumatic assemblies 56 and 58 when the cover or door 26 is moved from the closed position. While various suitable means can be employed, in the illustrated construction, this means includes an interlock switch 142. The interlock switch 142 is connected to the door 26 so that the interlock switch 142 is closed when the door 26 is closed and is opened when the door 26 is moved from the closed position. The manner in which the interlock switch 142 deactivates the pneumatic assemblies 56 and 58 is described below.

The apparatus 10 further comprises a bin 152 for containing broken glass, and means for deactivating the apparatus 10 when the bin 152 has therein a predetermined amount of glass, i.e., when the bin 152 is full. While various suitable means can be employed, in the preferred embodiment, this means includes a shut-off switch 106. The shut-off switch 106, which is normally closed, is opened when the bin 152 is full. Any suitable means, such as means responsive to the weight of the bin 152, can be used for opening the shut-off switch 106 when the bin 152 is full. The manner in which the shut-off switch 106 deactivates the apparatus 10 is described below.

The pneumatic circuit is operated by an electrical circuit which is illustrated in FIG. 6. The electrical circuit includes a power source 100, preferably an AC power source. One side of the power source 100 is connected to one terminal 102 of a first timer 104, and the other side of the power source 100 is coupled through the shut-off switch 106 to one terminal 108 of the motor 86, to one terminal 110 of the solenoid 92, and to one terminal 112 of the solenoid 98. Another terminal 114 of the timer 104 is connected to the other terminal 116 of the motor 86, to the other terminal 118 of the solenoid 98, and to terminals 120 and 131 of a clear switch 122. The clear switch 122 includes four terminals 120, 124, 130 and 131. As shown in FIG. 6, the clear switch 122 is normally biased to the position connecting the terminals 120 and 124 but can be manually actuated by pressing the clear button 168 to connect the terminals 130 and 131. When the clear button 168 is released, the switch 122 again connects the terminals 120 and 124. The terminal 124 of the clear switch 122 is connected to one terminal 126 of a second timer 128, and the terminal 130 of the clear switch 122 is connected to one terminal 132 of a third timer 134. The other terminals 136 and 138 of the timers 128 and 134 are connected to one terminal 140 of the interlock switch 142, and the other terminal 144 of the interlock switch 142 is connected to the other terminal 146 of the solenoid 92. Thus, when the door 26 is opened, the timers 128 and 134 are disconnected from the solenoid 98. This deactivates the solenoid 98, and the solenoid 98 remains deactivated until the interlock switch 142 is closed by closing the door 26.

The first timer 104, which controls the overall operation period of the apparatus 10, functions like a switch coupled between the timer terminals 102 and 114. When triggered, the timer 104 connects the terminals 102 and 114. In the preferred embodiment, the operating period is 25 seconds. Therefore, when the timer 104 is triggered, the timer terminals 102 and 114 are connected for 25 seconds.

The timer 104 is triggered by a normally closed trigger switch 150 connected to the door 26. When the door 26 is opened by the insertion of a bottle or bottles, the trigger switch 150 opens and triggers the timer 104. The timer 104 will then operate for 25 seconds regardless of whether the switch 150 is thereafter closed. Furthermore, opening of the door 26 and opening of the trigger switch 150 during operation of the timer 104 will reset the timer 104 for another 25-second period.

The timers 128 and 134 function like oscillating switches which connect and disconnect the respective timer terminals (and thereby energize and deenergize the solenoid 92, when switch 142 is closed) at constant frequencies. The timer 128 has a cycle time of 0.8 seconds, i.e., the terminals 126 and 136 are connected and disconnected once every 0.8 seconds. The timer 134 has a cycle time of 3.8 seconds, i.e., the terminals 132 and 138 are connected and disconnected once every 3.8 seconds.

Therefore, when the shut-off switch 106 and interlock switch 142 are closed and the clear button 168 is not pressed (so that the clear switch 122 is in the position connecting the upper terminals 120 and 124, as shown in FIG. 6), triggering of the timer 104 connects the motor 86 and the solenoid 98 to the power source 100 and energizes and deenergizes the solenoid 92 every 0.8 seconds, thereby causing alternating movement of the piston rods 68 and 78 every 0.8 seconds. When the switches 106 and 142 are closed and the clear button 168 is pressed (so that the switch 122 is moved to the position connecting the lower terminals 130 and 131), the motor 86 and the solenoid 98 are connected to the power source 100 and the solenoid 92 is energized and deenergized once every 3.8 seconds, thereby causing alternating movement of the piston rods 68 and 78 once every 3.8 seconds.

The apparatus 10 further comprises means for preventing bottles 46 from falling behind the plates 52. While various suitable means can be employed, in the preferred embodiment, this means includes respective pairs of elongated members 154 and 156 located above the respective troughs 20 and 21 and extending into the respective chambers 28 and 30. When a bottle 46 slides down a trough 20 or 21, it deflects the respective pair of members 154 or 156, as shown in FIG. 2. When the respective plate 52 is extended, the outer ends of the members engage the plate 52 and prevent the bottle from falling behind the plate 52.

Illustrated in FIG. 10 is an alternative means for preventing a bottle 46 from falling behind a plate 52. In the alternative construction, the chamber is extended upwardly or rearwardly, and the plate 52 has thereon a rearwardly extending deflector sleeve 160 having an outside diameter substantially equal to the outside diameter of the plate 52. Thus, when the plate 52 is extended, the deflector sleeve 160 prevents a bottle from falling behind the plate.

Illustrated in FIG. 9 is a cabinet 162 which is adapted to contain the apparatus 10. The cabinet 162 includes an inlet opening 164 affording access to the inlet 16 of the apparatus 10, a door 166 affording access to the bin 152, and the clear button 168.

The apparatus 10 is initially activated when the door 26 is opened by the insertion of a bottle or bottles. This opens the trigger switch 150 and triggers the first timer 104. The apparatus 10 will then operate for 25 seconds. Also, as mentioned above, opening of the door 26 during operation of the apparatus 10 will open the trigger switch 150 and reset the timer 104 for another 25-second period.

From the inlet 16, the bottles 46, which may be inserted by an operator in side-by-side relationship, slide down the troughs 20 and 21 into the chambers 28 and 30, where they are stopped by the bottle supporting rods 44. In the chambers, the bottles 46 are broken by the bottle breaking members 48 and 50. More particularly, a bottle is first shattered by a punch 54 and is then further broken by a plate 52. Because the plate 52 extends beyond the supporting rod 44 closest to the wall 28 or 30, as shown in FIG. 3, all of the pieces of broken glass are small enough to fall between the supporting rod 44 and the wall and into the bin 152. Because the plate 52 does not extend all the way to the wall, the bottle is not pulverized. Instead, the bottle is broken into relatively large pieces that are more suitable for recycling, are cleaner, and are safer to handle.

The operator can continue to insert bottles while the apparatus 10 is operating. Every time the door 26 is opened, the switch 142 is opened and the solenoid 98 is deactivated until the door 26 is closed. As long as the door 26 is closed, the bottle breaking members 48 and 50 will reciprocate at a frequency of one stroke every 0.8 seconds. If the apparatus 10 becomes jammed because a punch 54 is dull or because large bottles are being broken, the operator pushes the clear button 168. This moves the switch 122 to the position connecting the lower terminals 130 and 131 and switches from the second timer 128 to the third timer 134. This causes the bottle breaking members 48 and 50 to reciprocate at a frequency of one stroke every 3.8 seconds. As explained above, the lower frequency increases the forces breaking the bottles. When the operator releases the clear button 168, the bottle breaking members 48 and 50 return to the higher frequency.

The first timer 104 will shut down the apparatus 25 seconds after the door 26 was last opened. Thereafter, insertion of another bottle will start another 25 second cycle.

Various features of the invention are set forth in the following claims.

We claim:

1. A bottle breaking apparatus comprising
means for supporting a bottle,
a bottle breaking member,
means for applying to said member alternative first and second forces respectively moving said member toward and away from said supporting means, said force applying means including a cylinder, a piston connected to said member, said piston being slideably received in said cylinder and dividing said cylinder into first and second chambers, and means operating at a certain frequency for alternatingly supplying fluid to said first and second chambers, and
manually operable means for selectively increasing said first force, said means for increasing said first force including means for decreasing said frequency.

2. An apparatus as set forth in claim 1 and further comprising a chamber having therein said bottle supporting means, and a cover movable from a closed to an open position for affording access to said chamber, and means for deactivating said force applying means when said cover is moved from said closed position.

3. An apparatus as set forth in claim 1 and further comprising means for containing broken glass, and means for deactivating said force applying means when said containing means has therein a predetermined amount of glass.

4. An apparatus as set forth in claim 1 wherein said bottle breaking member includes a plate having extending therefrom only one punch, and wherein said bottle supporting means includes wall means for supporting the bottle opposite said punch so that the bottle is centered relative to said punch.

5. An apparatus as set forth in claim 4 wherein said wall means includes a V-shaped wall.

6. An apparatus as set forth in claim 1 and comprising means for supporting first and second bottles, first and second bottle breaking members respectively engageable with the first and second bottles, first and second cylinders, a first piston slideably received in said first cylinder and dividing said first cylinder into first and second chambers, a first piston rod extending through said second chamber of said first cylinder and connecting said first piston to said first bottle breaking member so that said first bottle breaking member moves toward the first bottle when fluid is supplied to said first chamber of said first cylinder, a second piston slideably received in said second cylinder and dividing said second cylinder into first and second chambers, a second piston rod extending through said second chamber of said second cylinder and connecting said second piston to said second bottle breaking member so that said second bottle breaking member moves toward the second bottle when fluid is supplied to said first chamber of said second cylinder, first conduit means communicating with said first chamber of said first cylinder and with said second chamber of said second cylinder, second conduit means communicating with said second chamber of said first cylinder and with said first chamber of said second cylinder, and means for alternatingly supplying pressurized fluid to said first and second conduit means.

7. An apparatus as set forth in claim 1 wherein said bottle breaking member has extending outwardly therefrom only one punch, and wherein said means for supporting a bottle includes wall means including opposed, converging wall segments which support opposite portions of the bottle so that the bottle is centered opposite said punch.

8. An apparatus as set forth in claim 7 wherein said wall means is V-shaped and includes opposed, converging, generally planar wall segments.

9. An apparatus as set forth in claim 7 wherein said member includes a plate facing said wall means, and wherein said plate moves in a direction generally perpendicular to said plate.

10. An apparatus as set forth in claim 7 wherein the bottle is not directly supported by said wall means opposite said punch.

11. An apparatus as set forth in claim 7 wherein said means for moving said member limits movement of said plate towards said wall means so that said plate does not pulverize the bottle.

* * * * *